United States Patent [19]

Appenzeller et al.

[11] Patent Number: 4,594,771

[45] Date of Patent: Jun. 17, 1986

[54] APPARATUS AND METHOD FOR AUTOMATICALLY INSERTING COILS AND WEDGES INTO A STATOR CORE OF ANY GIVEN LENGTH

[75] Inventors: Robert C. Appenzeller, Washington Township, Montgomery County; Curtis R. Bailey, Dayton; Ronald L. Gable, Brookville, all of Ohio

[73] Assignee: Machine Products Corporation, Dayton, Ohio

[21] Appl. No.: 652,126

[22] Filed: Sep. 20, 1984

[51] Int. Cl.⁴ .............................................. H02K 15/00
[52] U.S. Cl. ........................................ 29/596; 29/606; 29/734; 29/709; 29/712; 29/407
[58] Field of Search ................. 29/596, 606, 734, 709, 29/712, 714, 407

[56] References Cited

U.S. PATENT DOCUMENTS

| | | | |
|---|---|---|---|
| 3,722,063 | 3/1973 | Arnold | 29/596 |
| 3,829,953 | 8/1974 | Lauer et al. | 29/596 |
| 3,888,638 | 6/1975 | Walker | 29/734 |
| 3,949,464 | 4/1976 | Walker | 29/596 |
| 4,156,964 | 6/1979 | Walker | 29/734 |
| 4,347,657 | 9/1982 | Barrera | 29/596 |
| 4,433,475 | 2/1984 | Kubota et al. | 29/596 |
| 4,455,743 | 6/1984 | Witwer et al. | 29/596 |

Primary Examiner—Howard N. Goldberg
Assistant Examiner—P. W. Echols
Attorney, Agent, or Firm—Jacox & Meckstroth

[57] ABSTRACT

Apparatus for automatically inserting coils and wedges of proper dimensions into a stator core which may be any one of various lengths. The apparatus includes support structure which supports a stator core of a given length. The support structure also supports mechanism for insertion of prewound coils into the stator core. The support structure also supports a coil carrying tool which carries coils for insertion into the stator core. The support structure has relatively movable parts which move in proper relationship to each other and to the stator core for transferring prewound coils from the coil carrying tool to the slots of the stator core. The support structure also supports a wedge magazine which retains wedges of a proper length for the stator core of a given length. The support structure also supports a wedge guide unit and a wedge pusher unit which automatically operate to insert wedges of the proper length into the stator core.

20 Claims, 16 Drawing Figures

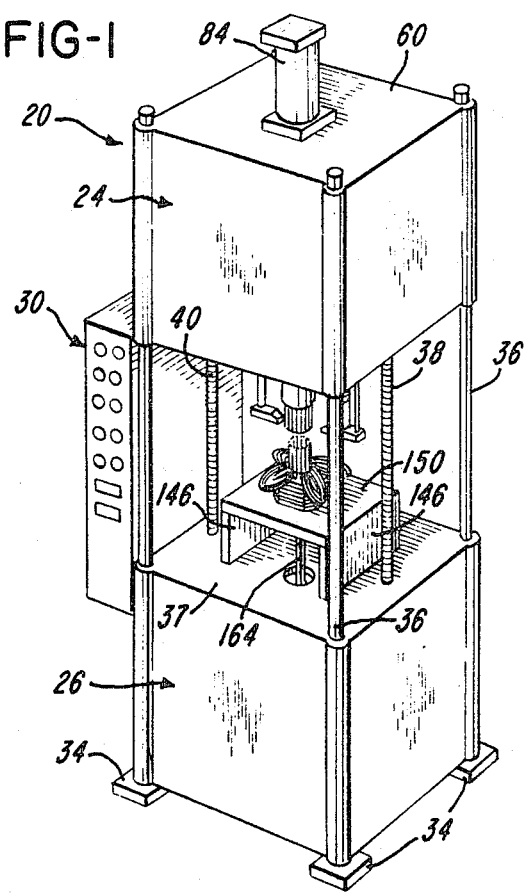
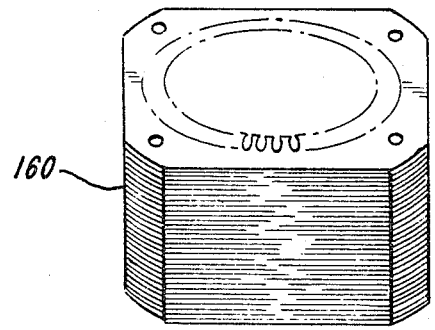
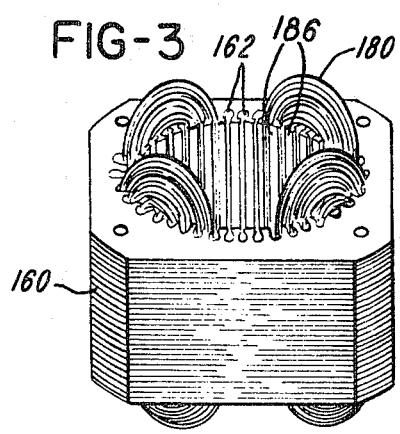
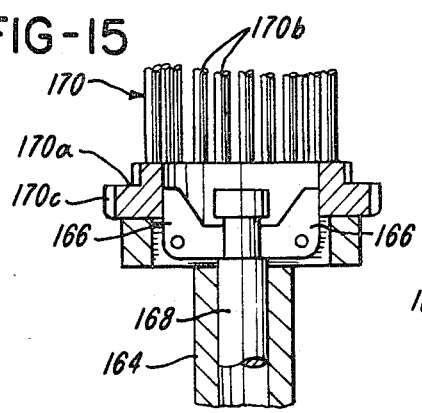
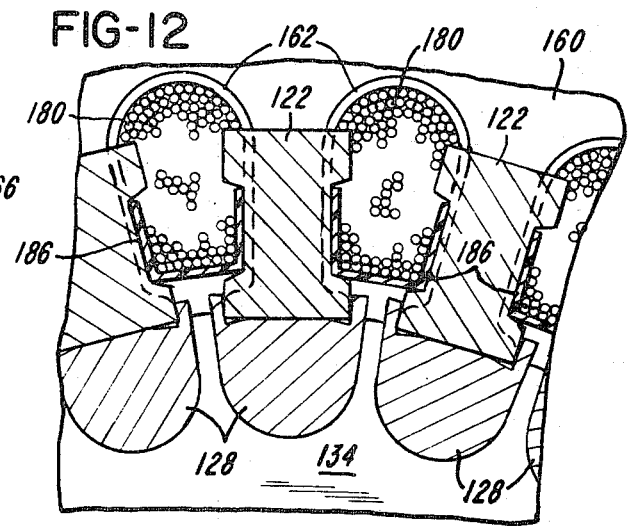

FIG-5
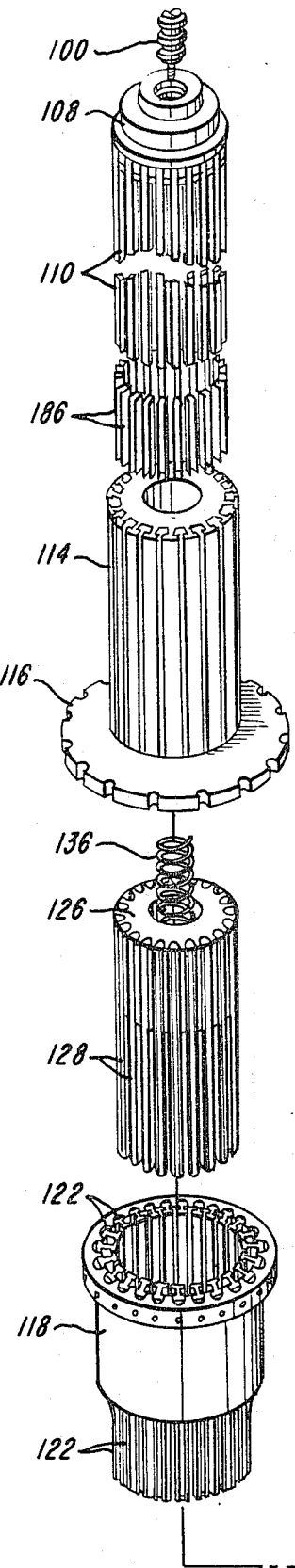
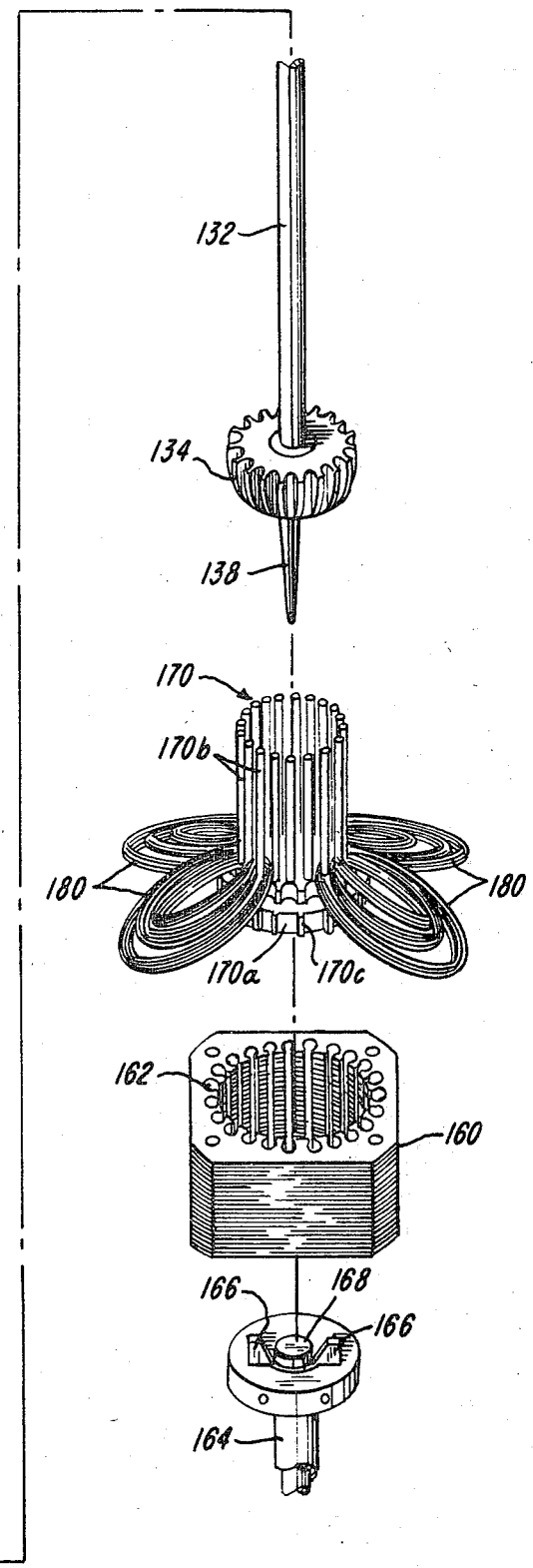

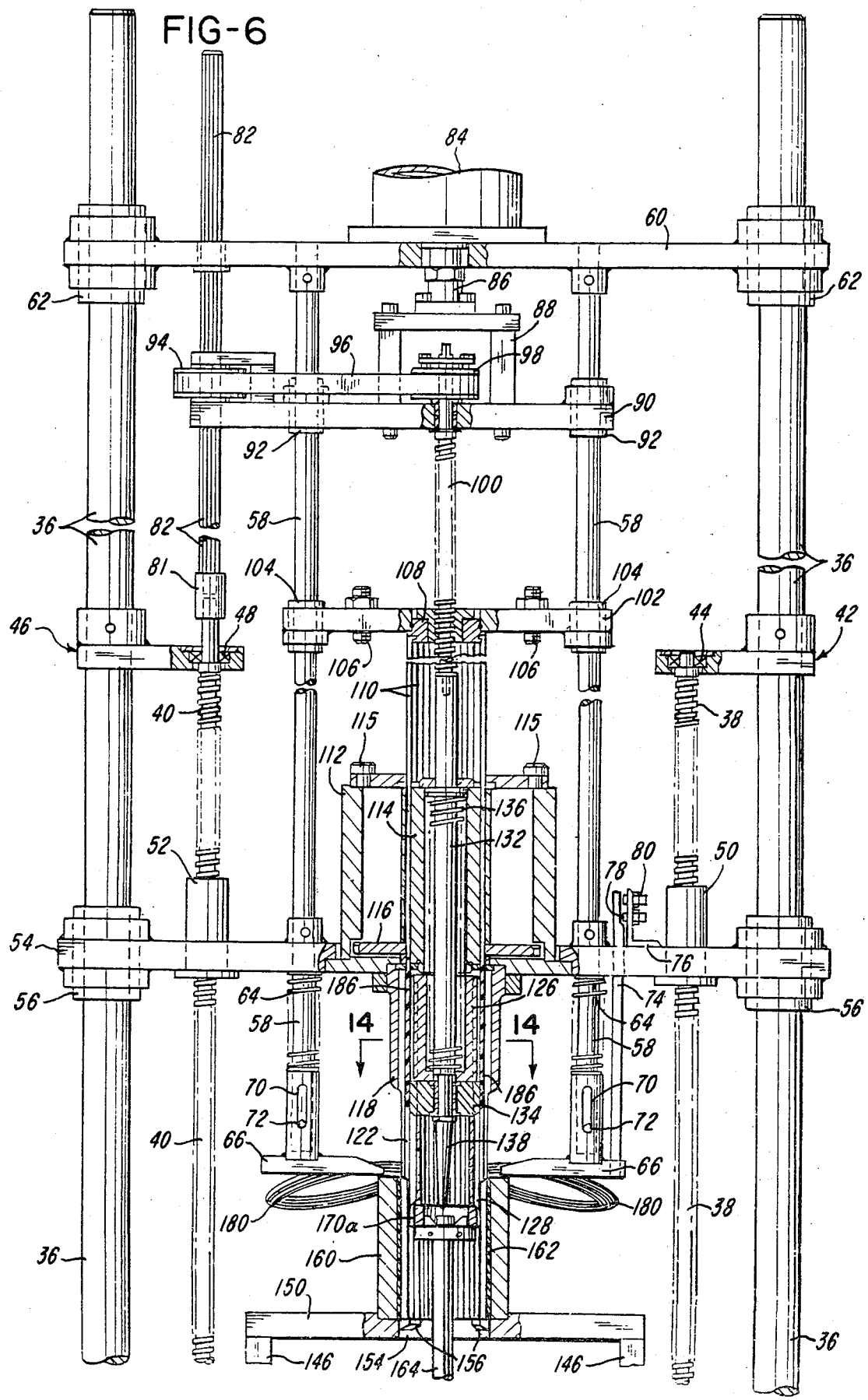

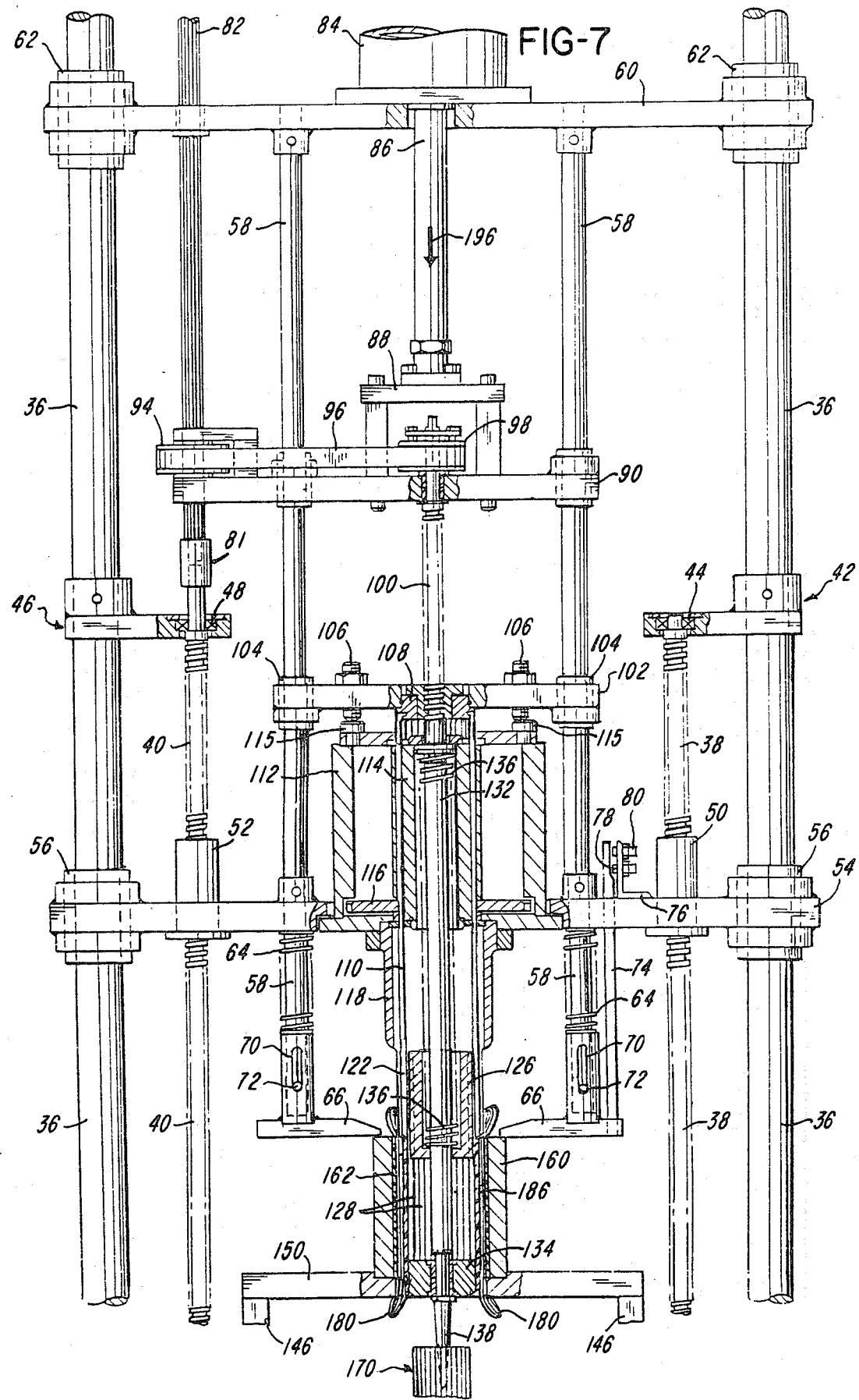

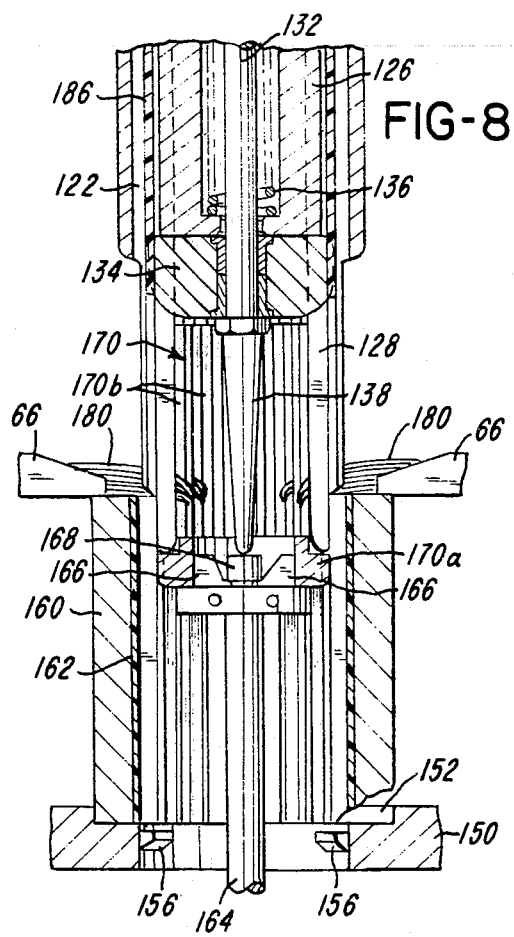
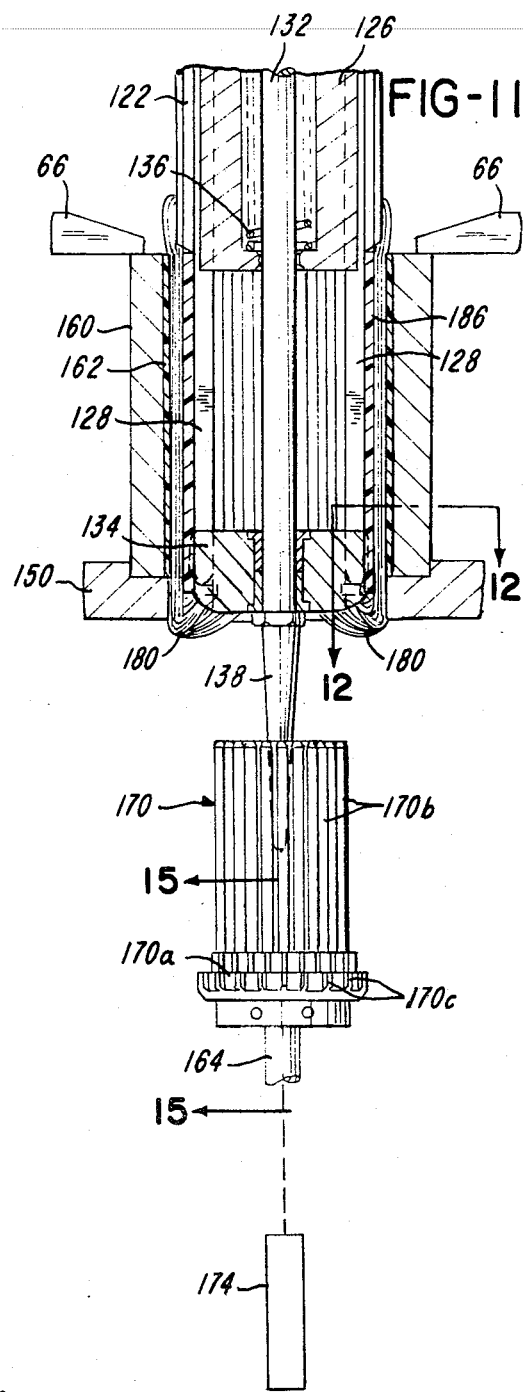
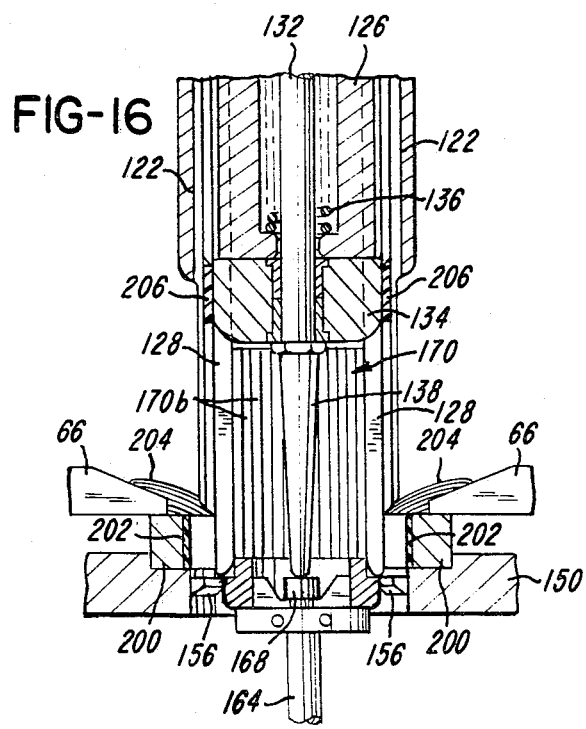

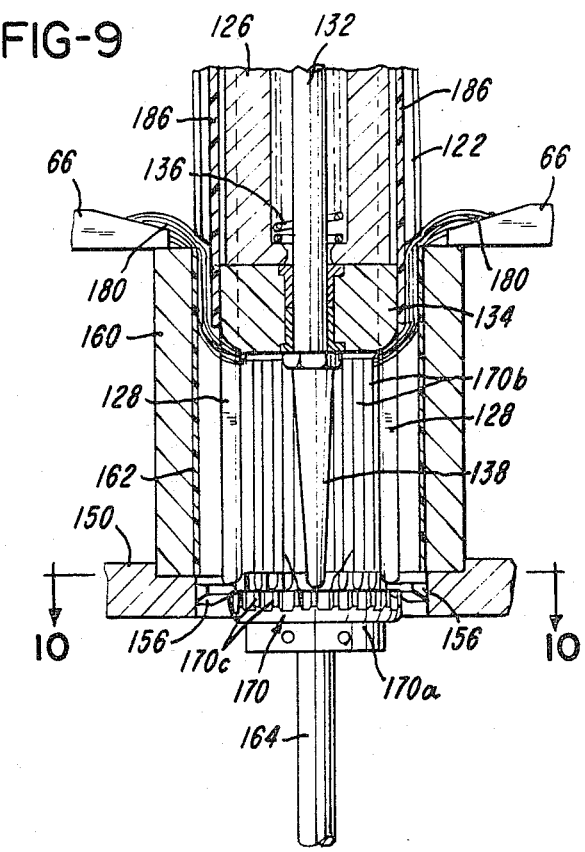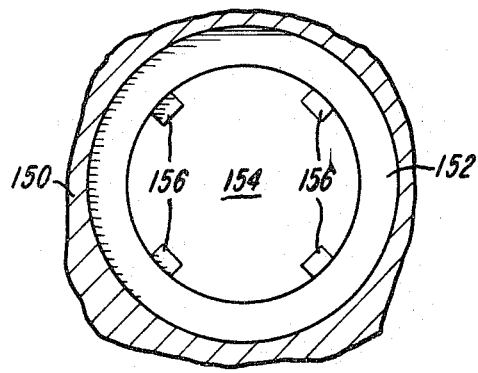

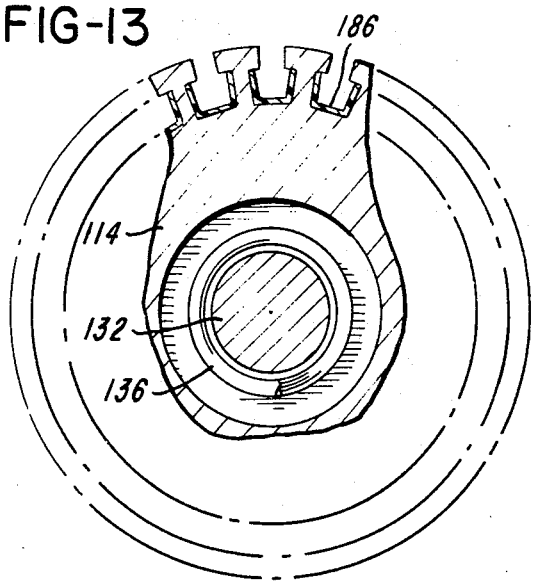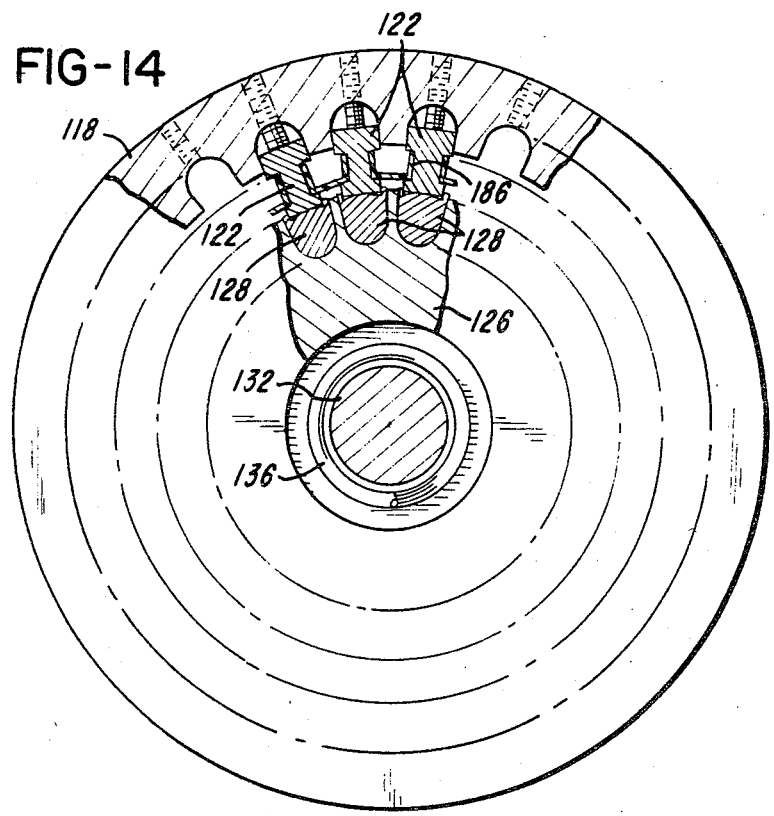

APPARATUS AND METHOD FOR AUTOMATICALLY INSERTING COILS AND WEDGES INTO A STATOR CORE OF ANY GIVEN LENGTH

BACKGROUND OF THE INVENTION

In the past a conventional procedure for inserting coils into a stator core of an electrical machine has been substantially as follows:

Coils for a stator core of a given length are formed on a winding mandrel and manually gathered on a transfer tool. The transfer tool is then positioned upon an inserter tool and the coils are then manually removed from the transfer tool and placed upon the inserter tool. The transfer tool is then removed from the inserter tool, and an alignment tool is positioned upon the inserter tool. Then a stator core of the given length is positioned upon the inserter tool. A fixed dimension adjustment member must be preset within the inserter tool to properly insert the coils by means of the inserter tool. The alignment tool must be manually removed after or during the insertion process.

An object of this invention is to provide apparatus by which the length of a stator core is automatically measured or sensed, and in which the apparatus automatically adjusts all adjustment members in accordance with the length of the stator core, and coils are inserted into the stator core without the use of a separate alignment tool and without the use of a fixed dimension adjustment member within the inserter tool. Thus, the apparatus of this invention automatically adjusts and operates in accordance with the length of the stator core and inserts prewound coils and wedges of proper dimensions into the stator core.

Another object of this invention is to provide such apparatus which also automatically inserts stator core wedges of the proper length into the slots of a stator core of any given length, as the coils are inserted into the stator core.

Other objects and advantages of this invention reside in the construction of parts, the combination thereof, and the mode of operation, as will become more apparent from the following description.

SUMMARY OF THE INVENTION

This invention comprises apparatus by which prewound coils and slot wedges designated for a stator core of a given length are automatically inserted into a stator core having the given length. The apparatus automatically measures the length of a stator core and functions to automatically insert the prewound coils and wedges into the stator core in accordance with the length of the stator core. No preset operation or adjustments of inserter tooling to accommodate for the length of the stator core are necessary.

BRIEF DESCRIPTION OF THE VIEWS OF THE DRAWING

FIG. 1 is a perspective view showing generally the apparatus of this invention.

FIG. 2 is a perspective view, drawn on a much larger scale than FIG. 1 illustrating a typical stator into which coils are inserted by the apparatus and method of this invention.

FIG. 3 is a perspective view similar to FIG. 2, illustrating the stator of FIG. 2 after coils and wedges have been inserted therein.

FIG. 5 is an exploded perspective view showing a portion of the apparatus drawn on a slightly larger scale than FIG. 4.

FIG. 6 is a view similar to FIG. 4, illustrating the apparatus in another position of operation.

FIG. 7 is a view similar to FIGS. 4 and 6 illustrating the apparatus in another position of operation.

FIG. 8 is a fragmentary sectional view of a portion of the apparatus as illustrated in FIG. 6.

FIG. 9 is a fragmentary sectional view similar to FIG. 8 showing the apparatus in another position of operation.

FIG. 10 is a fragmentary sectional view taken substantially on line 10—10 of FIG. 9.

FIG. 11 is a fragmentary sectional view similar to FIGS. 8 and 9, showing the apparatus in the position illustrated in FIG. 7.

FIG. 12 is an enlarged fragmentary sectional view taken substantially on line 12—12 of FIG. 11.

FIG. 13 is an enlarged sectional view taken substantially on line 13—13 of FIG. 4.

FIG. 14 is an enlarged sectional view taken substantially on line 14—14 of FIG. 6.

FIG. 15 is a fragmentary enlarged sectional view taken substantially on line 15—15 of FIG. 11.

FIG. 16 is a fragmentary sectional view similar to FIGS. 8, 9, and 11 and showing the apparatus in another position of operation.

DETAILED DESCRIPTION OF THE APPARATUS

Figure 4:
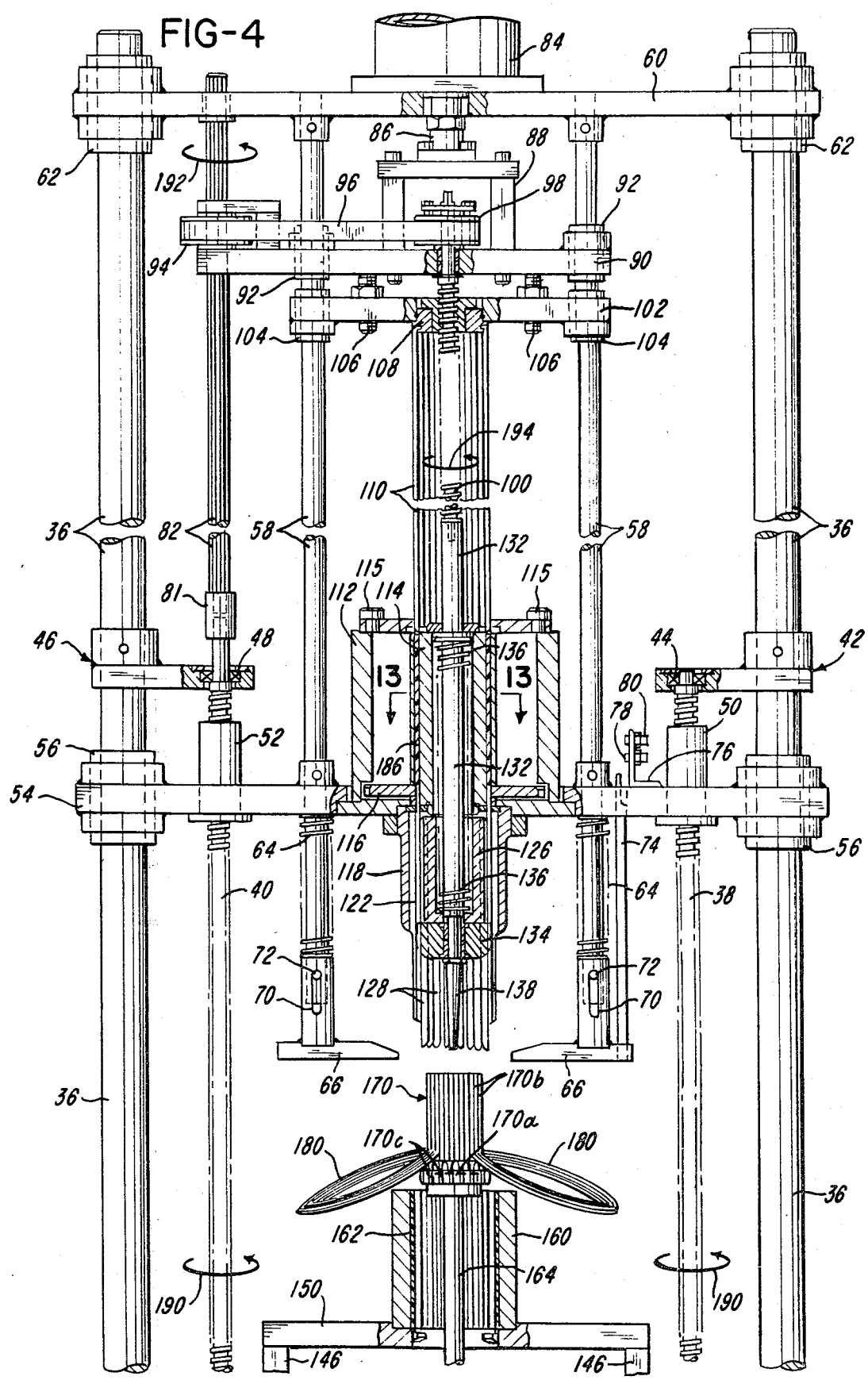
FIG. 4 is a fragmentary front elevational view, with parts broken away and parts shown in section, drawn on a larger scale than FIG. 1 and showing the apparatus of this invention.

The apparatus of this invention is adapted to automatically insert prewound coils and wedges into a stator core, in which the stator core may be any one of various lengths. A typical stator core is shown in FIG. 2. FIG. 3 shows the stator core after the coils and wedges are inserted therein Apparatus 20 of this invention is shown generally in FIG. 1. The upper portion of the apparatus 20 is shown in FIG. 1 enclosed by an enclosure member 24. The lower portion of the apparatus 20 is shown enclosed by an enclosure member 26.

A control unit 30 is shown attached to one side portion of the apparatus 20. Feet 34 support vertically extending guide posts 36.

Extending upwardly from the lower portion of the apparatus 20 and extending through a floor 37 are threaded rods 38 and 40. The lower ends of the rods 38 and 40 are attached to rotary power means, not shown, positioned within the enclosure member 26.

As shown in FIGS. 4, 6, and 7, a bracket 42 is fixedly attached to one of the guide posts 36. A bearing 44 within the bracket 42 encompasses the upper end of the threaded rod 38. A bracket 46 is fixedly attached to another post 36. A bearing 48 within the bracket 46 encompasses the upper end of the threaded rod 40. Nuts 50 and 52 are fixedly attached to a lower carriage member 54. Also attached to the lower carriage member 54 are guide sleeves 56, each of which slidably encompasses one of the guide posts 36. Extending through the lower carriage member 54 are support rods 58, which are fixedly attached to the lower carriage member 54. Attached to the upper portion of the support rods 58 is an upper carriage member 60. Also attached to the upper carriage member 60 are guide sleeves 62 which slidably encompass the guide posts 36.

Below the lower carriage member 54 and encompassing each of the support rods 58 is an elongate spring 64. The upper portion of each spring 64 engages the lower carriage member 54. The lower portion of each spring 64 engages a clamp 66. Each of the clamps 66 has an elongate slot 70 therein through which a pin 72 extends. Each pin 72 is attached to its respective support rod 58.

Attached to one of the clamps 66 and extending upwardly therefrom is a sensor rod 74. The sensor rod 74 extends through the lower carriage member 54 and is adjacent a sensor bracket 76. The sensor bracket 76 has attached thereto sensor members 78 and 80.

Extending upwardly from the threaded rod 40 and attached thereto by a coupling 81, in axial alignment with the threaded rod 40, is a splined shaft 82. The upper portion of the splined shaft 82 is slidably journalled in the upper carriage member 60.

Supported upon the upper carriage member 60 and attached thereto is a linearly operable motor 84, shown herein in the form of a hydraulic cylinder. An actuator rod 86, axially movable by the linearly operable motor 84, extends downwardly from the linearly operable motor 84 and has attached thereto a bracket 88. The bracket 88 is attached to a carrier 90. Sleeves 92 are attached to the carrier 90 and slidably encompass the support rods 58.

Encompassing the splined shaft 82 and rotatably supported upon the carrier 90 is a drive wheel 94 which is axially movable upon the splined shaft 82 but is rotatable with the splined shaft 82. Encompassing the drive wheel 94 and extending therefrom is a drive belt 96 which also encompasses a follower wheel or driven wheel 98. The follower wheel or driven wheel 98 is attached to a screw shaft 100 which is journalled in the carrier 90. The screw shaft 100 extends downwardly from the follower wheel or driven wheel 98 and from the carrier 90 through an elevator member 102 which is slidably attached to the support rods 58 by sleeves 104.

Attached to the elevator member 102 are abutment members 106. The screw shaft 100 is threadedly attached to the elevator member 102. Also attached to the elevator member 102 at the lower portion thereof is a ring 108. The ring 108 has elongate wedge pushers 110 attached thereto and extending downwardly therefrom. The wedge pushers 110 are arranged in an annular configuration and encompass the screw shaft 100, as best shown in FIG. 5.

Attached to the lower carriage 54 at the upper portion thereof is a housing 112. The housing 112 encompasses a wedge magazine 114, best shown in FIG. 5. The housing 112 has stop buttons 115 on the upper surface thereof. Attached to the wedge magazine 114 is an index wheel 116. Attached to the lower carriage 54 at the lower portion thereof is a shroud 118. Encompassed by the shroud 118 and supported thereby are wedge guides 122 which are arranged in annular configuration, as best shown in FIG. 5.

Within the shroud 118 is an insertion blade retainer 126 which retains a plurality of coil insertion blades 128, arranged in annular configuration. Attached to the screw shaft 100 in axial alignment therewith and extending downwardly therefrom is a connector shaft 132. The connector shaft 132 extends through the housing 112 and through the wedge magazine 114 and through the lower carriage 54. The connector shaft 132 also extends through the blade retainer 126. A coil stripper 134 is attached to the connector shaft 132, at the lower portion thereof. A coil spring 136 encompasses the connector shaft 132 and is compressed between the blade retainer 126 and the wedge magazine 114. The stripper 134 has a stem 138 attached thereto at the central portion thereof and extending downwardly therefrom.

As shown in FIG. 1, supported upon the floor 37 by legs 146 is a table 150. The table 150 has an opening 154 therethrough. Within the opening 154 the table 150 has a plurality of abutments 156, best shown in FIG. 10. The table 150 has a recessed portion 152, which is adapted to receive a stator core 160 of the type generally illustrated in FIG. 2. Within the stator core 160 are slot insulators 162.

Extending upwardly from the lower portion of the apparatus 20, through the floor 37, is an actuator tube 164. Grippers 166 are pivotally attached to the upper portion of the actuator tube 164, as best shown in FIG. 15. Within the actuator tube 164, and axially movable with respect thereto, is an actuator rod 168. The actuator tube 164 is adapted to support a coil carrying tool 170. Herein the coil carrying tool 170 is shown in the form of a transfer tool upon which coils are positioned as the coils are wound. However, the coil carrying tool 170 may be any member or device upon which coils are supported. The coil carrying tool 170 includes an annular alignment portion 170a and elongate fingers 170b, which extend axially from the annular alignment portion 170a. The alignment portion 170a has peripheral teeth 170c, as best shown in FIGS. 11 and 15. The annular alignment portion 170a is engaged internally by the gripper fingers 166. The gripper fingers 166 are operably joined to the actuator tube 164 and to the actuator rod 168.

OPERATION

A stator core, such as the core 160, provided with slot insulators 162, is placed upon the table 150 and is positioned within the recess 152 of the table 150. The actuator tube 164, with the actuator rod 168, is movable upwardly and downwardly by a linearly operable fluid motor 174, shown diagrammatically in FIG. 11. The linearly operable fluid motor 174 is within the enclosure 26. The actuator tube 164 is moved by the linearly operable fluid motor 174 upwardly through the stator core 160. In this position, the grippers 166 are above the stator core 160, as shown in FIG. 4. A coil carrying tool, such as the coil carrying tool 170, is properly oriented and positioned to be grasped by the grippers 166. The coil carrying tool 170 supports prewound coils 180, which are carried by the elongate fingers 170b, as shown in FIGS. 4 and 5. The grippers 166 grasp the alignment portion 170a of the coil carrying tool 170 and retain the coil carrying tool 170 in proper oriented position above the stator core 160, as shown in FIG. 4.

Wedges 186 of proper length with respect to the length of the stator core 160 are positioned within the wedge magazine 114.

Then the threaded rods 38 and 40 are rotated as illustrated by arrows 190 in FIG. 4, by means not shown located within the enclosure 26 at the lower portion of the apparatus 20. The threaded rods 38 and 40 are in threaded engagement with the nuts 50 and 52 which are attached to the lower carriage 54. Therefore, rotation of the threaded rods 38 and 40 causes the lower carriage 54 to move downwardly. Due to the fact that the upper carriage 60 is attached to the lower carriage 54 by means of the support rods 58, the upper carriage 60 also moves downwardly with downward movement of the lower carriage 54 and with rotation of the threaded rods 38 and 40.

As stated above and as shown, the carrier 90 is attached to the bracket 88, and the bracket 88 is attached to the actuator rod 86. Therefore, with downward movement of the upper carriage 60, the carrier 90 is moved downwardly. The splined shaft 82 rotates with rotation of the threaded rod 40, as indicated by an arrow 192. Rotation of the splined shaft 82 causes rotation of the drive wheel 94, and rotation of the drive wheel 94 causes rotation of the drive belt 96. Rotation of the drive belt 96 causes rotation of the follower wheel 98. Due to the fact that the follower wheel 98 is attached to the screw shaft 100, the screw shaft 100 is rotated, as illustrated by an arrow 194 in FIG. 4. Rotation of the screw shaft 100 causes downward movement of the elevator 102. As the elevator 102 is moved downwardly by the screw shaft 100, the space between the elevator 102 and the carrier 90 increases, as illustrated in FIG. 6.

Therefore, the upper carriage member 60 and the lower carriage member 54 are moved downwardly by rotation of the threaded rods 38 and 40. While this occurs, the elevator 102 is also being moved downwardly with respect to the upper carriage 60 as a result of rotation of the splined shaft 82 and the screw shaft 100.

As the lower carriage 54 and the upper carriage 60 move downwardly with rotation of the threated rods 38 and 40, the support rods 58, which are attached to the carriages 54 and 60, move downwardly. Thus, the clamps 66, at the lower ends of the support rods 58, are moved downwardly until the clamps 66 engage the upper surface of the stator core 160. The threaded rods 38 and 40 continue to rotate. The carriages 54 and 60 continue downward movement, and the springs 64 which encompass the support rods 58, are further compressed. The clamps 66 remain fixed, and the pins 72 in the support rods 58 move downwardly in the slots 70, until the sensor members 78 and 80 become positioned adjacent the sensor rod 74. The sensor members 78 and 80 then, through circuitry, not shown, cause the drive means for the threaded rods 38 and 40 to cease operation. When the threaded rods 38 and 40 cease to rotate, the apparatus 20 appears generally, as shown in FIGS. 6 and 8.

During operation of the parts of the apparatus 20 from the positions thereof shown in FIG. 4 to the positions thereof shown in FIG. 6, rotation of the splined shaft 82 and the screw shaft 100 causes downward movement of the elevator 102. Downward movement of the elevator 102 causes downward movement of the wedge pushers 110. The wedge pushers 110 force the wedges 186 to move from the wedge magazine 114. The wedges 186 are moved downwardly to the position shown in FIGS. 6 and 14. Thus, the wedges 186 are moved into the shroud 118, as shown in FIG. 6.

Also in the position illustrated in FIG. 6, the coil insertion blades 128 have engaged the alignment portion 170a of the coil carrying tool 170 and have forced the coil carrying tool 170 a short distance into the stator core 160, as shown in FIGS. 6 and 8. The grippers 166, which retain and support the coil carrying tool 170, and the actuator tube 164 are also moved downwardly with the coil carrying tool 170, as the coil insertion blades 128 engage the alignment portion 170a of the coil carrying tool 170. Also in the position shown in FIG. 6 the wedge guides 122 have the lower ends thereof adjacent the stator core 160. Also in the position shown in FIG. 6 the lower ends of the wedges 186 are slightly above the lower portion of the stripper 134. Due to the fact that the threaded rods 38 and 40 have ceased to rotate, all parts of the apparatus 20 are now accurately positioned substantially as shown in FIG. 6.

Then the linearly operable motor 84 is energized. The linearly operable motor 84 forces the actuator rod 86 axially downwardly, as illustrated by an arrow 196 in FIG. 7. Downward movement of the actuator rod 86 forces downward movement of the carrier 90. Due to the fact that the elevator 102 is connected to the carrier 90 through the screw shaft 100, downward movement of the carrier 90 causes downward movement of the elevator 102. Downward movement of the carrier 90 also causes axial downward movement of the screw shaft 100, but without rotation of the screw shaft 100. Thus, the connector shaft 132, which is joined to the screw shaft 100, moves axially downwardly and moves the wedge pushers 110, the insertion blades 128, and the stripper 134 downwardly. The insertion blades 128 are urged downwardly as the spring 136 engages the insertion blade retainer 126 and urges the insertion blade retainer 126 downwardly. The insertion blades 128, which are in engagement with the coil carrying tool 170, force downward movement of the coil carrying tool 170 within the stator core 160 until the insertion blades 128 engage the abutments 156, as shown in FIG. 9. Thus, the proper position of the insertion blades 128 with respect to the stator core 160 is established. However, downward movement of the connector shaft 132 continues, and the coil spring 136 is compressed as the stripper 134 and the wedge pushers 110 continue downward movement.

Downward movement of the elevator 102 and the connector shaft 132 continues until the abutment members 106, carried by the elevator 102, engage the stop buttons 115 on the upper surface of the housing 112, as shown in FIG. 7. As the coil carrying tool 170 travels downwardly within the stator core 160, the coils 180 move from the coil carrying tool 170. Downward movement of the stripper 134 forces the coils 180 into the slots of the stator core 160, as shown in FIGS. 7, 11, and 12. During this downward movement, the wedge pushers 110 have forced the wedges 186 into the slots of the stator core 160, as best shown in FIG. 12.

As stated, downward travel of the stripper 134 continues after the insertion blades 128 have engaged the abutments 156 and the insertion blades 128 have ceased movement. As the stripper 134 continues downward travel, the stem 138 engages the actuator rod 168 within the coil carrying tool 170. When this engagement of the stem 138 with the actuator rod 168 occurs, control means, not shown, actuates the fluid motor 174 to withdraw the coil carrying tool 170 downwardly from the table 150, as illustrated in FIGS. 7 and 11.

Thus, the apparatus 20 has automatically inserted coils 180 into the slots of the stator core 160, followed by inserting the wedges 186 into the slots of the stator core 160. The stator core 160 with the coils 180 and wedges 186 therein then appears substantially as shown in FIG. 3.

Thus, it is understood that in the operation of the apparatus of this invention a stator core having any given length is positioned upon the table 150. As the clamps 66 are moved downwardly and engage the upper surface of the stator core, the length of the stator core is sensed and/or measured. The apparatus then operates to move the stripper 134, the insertion blades 128, and the wedge pushers 110 through proper distances of travel to insert the coils and the wedges into the stator core, in accordance with the length of the stator core. Thus, it is understood that the apparatus of this invention is capable of automatically inserting coils and wedges into a stator core of any given length.

As another example, FIG. 16 shows a stator core 200 which has a shorter length than the stator core 160. The stator core 200 is provided with slot insulators 202. Coils 204 of a suitable length are carried by the coil carrying tool 170, and the coil carrying tool 170 is properly oriented and positioned by the actuator tube 164 above the stator core 200. Wedges 206 of proper length are positioned in the wedge magazine 114. Then as the threaded rods 38 and 40 are rotated, the clamps 66 are moved downwardly until they engage the upper surface of the stator core 200. Due to the fact that the length of the stator core 200 is considerably less than the length of the stator core 160, the upper carriage 60 and the lower carriage 54 must travel farther downwardly before the clamps 66 engage the stator core 200. Thus, all the elements carried by the carriages 54 and 60 are moved downwardly a greater distance before the clamps 66 engage the stator core 200. Furthermore, due to the fact that the threaded rods 38 and 40 have rotated through a greater number of revolutions for movement of the clamps 66 into engagement with the stator core 200, the screw shaft 100 has rotated through a greater number of revolutions. Thus, the spacing between the carrier 90 and the elevator 102 is greater when the clamps 66 engage the stator core 200. Thus, the wedges 206, which are shorter in length than the wedges 186, are moved a greater distance from the wedge magazine 114. In this manner, all other elements and conditions of the apparatus and method are established for insertion of coils 204 and wedges 206 into the stator core 200. When this engagement occurs, all of the elements of the apparatus 20 have been automatically adjusted for proper insertion of the coils 204 and the wedges 206 into the stator core 200. The apparatus 20 then proceeds to operate in the manner discussed above with respect to insertion of coils and wedges into the stator core.

Although the preferred embodiment of the apparatus of this invention has been described, it will be understood that within the purview of this invention various changes may be made in the form, details, proportion and arrangement of parts, the combination thereof, and the mode of operation, which generally stated consist in a structure within the scope of the appended claims.

The invention having thus been described, the following is claimed:

1. Apparatus for automatically inserting prewound coils into slots of a stator core comprising:
   support means for supporting a stator core,
   sensor means for sensing the height of a stator core,
   a coil carrying tool for retaining prewound coils,
   wedge magazine means for retaining wedges,
   wedge pusher means for moving wedges into slots of a stator core,
   wedge guide means for guiding movement of wedges,
   coil insertion blade means for insertion of coils into slots of a stator core,
   support structure,
   means joining the wedge magazine means and the wedge pusher means and the wedge guide means and the coil insertion means to the support structure,
   means joining the sensor means to the support structure,
   means for relative movement between the coil carrying tool and the support means for relative movement between the stator core and the coil carrying tool, such relative movement being in accordance with the height of the stator core sensed by the sensor means,
   means for relative movement between the stator core and the support structure for relative movement between the wedge pusher means and the coil insertion blade means and the stator core for inserting coils into the stator core as the stator core encompasses the coil carrying tool and as wedges are inserted into the stator core, such relative movement being in accordance with the height of the stator core sensed by the sensor means.

2. The apparatus of claim 1 in which the means for relative movement between the stator core and the support structure includes a threaded rod and means joining the threaded rod to the support structure.

3. The apparatus of claim 1 in which the support structure includes a carriage supporting the wedge magazine means and the wedge pusher means, means for relative movement between the wedge magazine and the wedge pusher means, and means for movement of the wedge magazine and the wedge pusher means with respect to the support means.

4. The apparatus of claim 1 which also includes stripper means for movement of coils into slots of a stator core and in which the support means is stationary and in which the support structure is movable with respect to the support means, and means for relative movement between the coil insertion blade means and the stripper means.

5. The apparatus of claim 1 which also includes stripper means for movement of coils into slots of a stator core and in which the support structure includes a carriage and guide posts, the carriage being movable with respect to the guide posts, means joining the wedge pusher means and the coil insertion blade means and the stripper means to the carriage.

6. The apparatus of claim 1 in which the support means is stationary and in which the support structure includes substantially vertical guide posts, a carriage movable with respect to the guide posts and guided thereby, a threaded rod, means threadedly attaching the carriage to the threaded rod for movement of the carriage with rotation of the threaded rod, a carrier means joining the carrier to the carriage for relative movement between the carriage and the carrier, a screw shaft rotatably supported by the carrier, means operatively joining the screw shaft to the threaded rod for rotation of the screw shaft with rotation of the threaded rod, an elevator threadedly joined to the screw shaft, means joining the wedge magazine to the elevator for movement therewith, means joining the wedge pusher means and the coil insertion blade means to the screw shaft for axial movement thereof with axial movement of the screw shaft.

7. The apparatus of claim 1 in which the coil carrying tool includes an annular base provided with peripheral projections, a set of annularly arranged fingers attached to the base and extending in an axial direction therefrom, the fingers being adapted to receive and support prewound coils, the projections serving as alignment means for aligning the coils with respect to the slots of the stator core as the coil carrying tool moves into the stator core.

8. The method of automatically inserting coils and wedges into a stator core of any length comprising:
   positioning a stator core,
   operatively moving engagement means from a given position into engagement with the stator core to sense the length of the stator core,
   positioning coil carrying means adjacent the stator core and in axial alignment therewith,
   positioning wedge guide means and stripper means and wedge pusher means and coil insertion blade means adjacent the coil carrying means and in axial alignment therewith,
   coordinating operation of the coil carrying means and the wedge guide means and the stripper means and the wedge pusher means and the coil insertion means with operation of the engagement means,
   moving the wedge guide means into juxtaposition with the stator core,
   moving the coil carrying means into the stator core in accordance with the length of the stator core sensed by movement of the engagement means,
   moving the coil insertion blade means and the stripper means into the stator core and transferring the coils from the coil carrying means to the stator core, said movement being in accordance with the length of the stator core sensed by movement of the engagement means,
   and moving the wedge pusher means toward the stator core for movement of wedges into the stator core in accordance with the length of the stator core sensed by movement of the engagement means.

9. Apparatus for automatic insertion of prewound coils and wedges into a stator core having stator slots and in which the stator core may be any length, comprising:
   support structure for support of a stator core,
   measurement means movable from a given position and engageable with the stator core for sensing the length of the stator core,
   coil insertion means for inserting coils into a stator core,
   wedge insertion means for inserting wedges into a stator core,
   operator means,
   means joining the operator means to the measurement means and to the coil insertion means and to the wedge insertion means for coordinating operation of the measurement means with operation of the coil insertion means and the wedge insertion means,
   the operator means operating in accordance with the length of the stator core measured by movement of the measurement means for operation of the coil insertion means and the wedge insertion means for insertion of coils and wedges into the stator slots of the stator core in accordance with the length of the stator core.

10. The apparatus of claim 9 in which the measurement means includes clamping means for clamping the stator core with respect to the support structure.

11. The apparatus of claim 9 in which the coil insertion means includes a coil carrying tool upon which coils are positioned as the coils are wound, means for movement of the coil carrying tool through the stator core, and means for transferring the coils from the coil carrying tool into the stator slots of the stator core.

12. The apparatus of claim 9 in which the measurement means includes a carriage, engagement means carried by the carriage and movable therewith, the operator means including means for movement of the carriage and for movement of the engagement means into engagement with a stator core which is supported by the support structure.

13. The apparatus of claim 9 in which the measurement means includes a carriage, engagement means carried by the carriage and movable therewith, the operator means including means for movement of the carriage for movement of the engagement means into engagement with a stator core which is supported by the support structure, the operator means including means joining the coil insertion means and the wedge insertion means to the carriage for movement of the coil insertion means and the wedge insertion means with respect to the carriage.

14. Apparatus for automatic insertion of prewound coils and wedges into a stator core having stator slots and in which the stator core may be any one of various lengths, comprising:
   support structure for support of a stator core,
   measurement means for sensing the length of the stator core,
   coil insertion means for inserting coils into a stator core,
   wedge insertion means for inserting wedges into a stator core,
   operator means joining the measurement means to the coil insertion means and to the wedge insertion means for operation of the coil insertion means and the wedge insertion means for insertion of coils and wedges into the stator slots of the stator core in accordance with the length of the stator core,
   the measurement means comprising a carriage movable toward and away from the support structure and movable toward and away from a stator core supported by the support structure, a threaded rod fixed in position and threadedly joined to the carriage and rotatable to move the carriage toward and away from the support structure, engagement means, means joining the engagement means to the carriage for movement of the engagement means with movement of the carriage, the engagement means moving with the carriage and moving into engagement with a stator core which is supported by the support structure, engagement of the engagement means with the stator core establishing the position of the carriage with respect to the stator core, and means joining the coil insertion means and the wedge insertion means to the carriage for operation of the coil insertion means and the wedge insertion means with respect to the stator core.

15. The method of automatic insertion of coils and wedges into the slots of a stator core which may have any given length comprising:
   positioning a stator core in a suitable location, operatively moving an engagement unit from a given position into engagement with the stator core to sense the length of the stator core, positioning a wedge magazine unit at a given position, positioning a wedge guide unit in axial alignment with the stator core, positioning a coil carrying tool unit in axial alignment with the stator core, the coil carrying tool unit carrying coils which are adapted to be inserted into a stator core having the length sensed by movement of the engagement unit, moving the wedge guide unit to a position adjacent the stator core, moving wedges from the wedge magazine unit to a position adjacent the wedge guide unit, such movement being in accordance with the length of the stator core measured by movement of the engagement unit from said given position into engagement with the stator core, moving the coil carrying tool unit through the stator core and transferring the coils from the coil carrying tool to the slots of the stator core, such movement being in accordance with the length of the stator core sensed by movement of the engagement unit from said given position into engagement with the stator core, moving wedges from the position thereof adjacent the wedge guide unit into the slots of the stator core, such movement being guided by the wedge guide unit and in accordance with the length of the stator core sensed by movement of the engagement unit from said given position into engagement with the stator core, said method including coordinating movement of the wedge guide unit and the coil carrying unit with movement of the engagement unit.

16. The method of inserting prewound coils and wedges into the slots of a stator core having any length comprising:

positioning a stator core at a given position, moving engagement means from a given position into engagement with the stator core to measure the length of the stator core, positioning a coil carrying tool adjacent the stator core, the coil carrying tool carrying coils suitable for insertion into a stator core of the length measured, positioning coil insertion means adjacent the stator core, positioning wedge insertion means adjacent the stator core, the wedge insertion means retaining wedges of a length suitable for insertion into a stator core of the length measured by movement of the engagement means, coordinating movement of the coil carrying tool and the coil insertion means and the wedge insertion means with respect to movement of the engagement means, moving the coil carrying tool into the stator core, such movement being in accordance with the length of the stator core measured by movement of the engagement means, moving the coil insertion means into the stator core and transferring the coils from the coil carrying tool into slots of the stator core, such movement being in accordance with the length of the stator core measured by movement of the engagement means, moving the wedge insertion means with respect to the stator core for movement of wedges into the slots of the stator core, such movement being in accordance with the length of the stator core measured by movement of the engagement means.

17. Apparatus for automatic insertion of prewound coils into a stator core comprising:

support structure for support of a stator core having a central axis, sensing means for sensing the length of the stator core, a coil carrying tool, the coil carrying tool having an annular alignment portion and elongate fingers extending axially from the annular alignment portion, support means for supporting the coil carrying tool in axial alignment with the stator core and with the elongate fingers of the coil carrying tool extending in a direction from the stator core and retaining prewound coils, a coil insertion blade unit and a stripper unit and a wedge insertion unit positioned in axial alignment with the coil carrying tool, operator means, means joining the operator means and the sensing means, the operator means including means moving the coil carrying tool and the coil insertion blade unit and the stripper unit into the stator core for transfer of the coils from the coil carrying tool to the stator core, the operator means including means operating the wedge insertion unit for moving wedges into the stator core following movement of the stripper unit into the stator core, the operator means operating in accordance with the length of the stator core.

18. The apparatus of claim 17 which includes a carriage movable toward and away from the stator core, means attaching the wedge insertion unit to the carriage for movement therewith, connector means, means joining the connector means to the stripper unit and to the coil insertion blade unit, the operator means including means operably joined to the carriage and to the connector means for movement of the connector means and the coil insertion blade unit and the stripper unit with respect to the stator core.

19. The apparatus of claim 17 in which the sensing means includes means for engaging a stator core as the stator core is supported by the support structure.

20. Apparatus for automatically inserting prewound coils into the slots of a stator core comprising:

a plurality of substantially vertical guide posts, a carriage joined to the guide posts for upward and downward movement of the carriage with respect to the guide posts, the carriage having an upper portion and a lower portion, a clamping member, means attaching the clamping member to the carriage for movement therewith, wedge guide means, means attaching the wedge guide means to the carriage for movement therewith, a substantially vertical threaded drive rod threadedly and rotatably joined to the carriage for movement of the carriage with rotation of the threaded rod, a splined shaft joined to the threaded drive rod for rotation of the splined shaft with rotation of the threaded drive rod, a substantially vertical support rod positioned between the upper portion of the carriage and the lower portion of the carriage and attached thereto, a carrier positioned between the upper and lower portions of the carriage and joined to the support rod for movement upwardly and downwardly with respect to the support rod, a drive wheel supported by the carrier and joined to the splined shaft for rotation therewith, the drive wheel being axially movable with respect to the splined shaft, a driven wheel rotatably supported by the carrier and movable upwardly and downwardly with the carrier, a flexible drive member encompassing the drive wheel and the driven wheel and joining the drive wheel to the driven wheel and rotatable therewith, a substantially vertical screw shaft attached to the driven wheel for rotation therewith, a linearly operable motor, means attaching the linearly operable motor to the carriage for support of the linearly operable motor by the carriage, means operably joining the linearly operable motor to the carrier for upward and downward movement of the carrier with respect to the carriage, an elevator joined to the support rod and movable upwardly and downwardly with respect thereto, means threadedly attaching the elevator to the screw shaft for upward and downward movement of the elevator with rotation of the screw shaft, a wedge magazine carried by the carriage between the upper and lower portions thereof and adapted to receive wedges, a wedge pusher, means attaching the wedge pusher to the elevator for movement upwardly and downwardly with upward and downward movement of the elevator, the wedge pusher being operable upon wedges within the wedge magazine for movement of the wedges with respect to the wedge magazine, coil insertion blade means, means attaching the coil insertion blade means to the screw shaft for movement of the coil insertion blade means with axial movement of the screw shaft, stripper means, means attaching the stripper means to the screw shaft for movement of the stripper means with axial movement of the screw shaft, stator core support means positioned below the carriage for supporting a stator core, a transfer tool adapted to support prewound coils, transfer tool support means for supporting a transfer tool above the stator core support means and for movement of a transfer tool upwardly and downwardly with respect to a stator core which is supported by the stator core support means, the carriage being moved upwardly and downwardly by rotation of the threaded drive rod, downward movement of the carriage moving the clamping member downwardly into engagement with the stator core, the clamping member retaining the stator core with respect to the stator core support means, the wedge guide means being moved downwardly with downward movement of the carriage to a position adjacent the stator core, the splined shaft rotating with rotation of the threaded rod, the drive wheel rotating with rotation of the splined shaft and rotating the flexible drive member and the driven wheel, the screw shaft thus rotating with rotation of the driven wheel, the elevator moving downwardly with rotation of the screw shaft and with respect to the carriage, the wedge magazine and the wedges within the wedge magazine moving downwardly with downward movement of the elevator and with respect to the carriage, the coil insertion blade means and the wedge guide means moving downwardly with downward movement of the elevator and with respect to the carriage, the carrier and the elevator and the screw shaft being moved axially downwardly with respect to the carriage with operation of the linearly operable motor, the transfer tool and the stripper means being moved downwardly and into the stator core with downward axial movement of the screw shaft, the wedge pusher being moved downwardly with axial downward movement of the screw shaft, downward movement of the stripper means forcing the coils carried by the transfer tool into the stator core, downward movement of the wedge pusher forcing wedges into the stator core.

* * * * *